United States Patent [19]

Wiltshire

[11] Patent Number: 5,205,197
[45] Date of Patent: Apr. 27, 1993

[54] PALLET CUTTING MACHINE

[75] Inventor: Cecil K. Wiltshire, Southampton, United Kingdom

[73] Assignee: GKN Chep Limited, Addlestone, United Kingdom

[21] Appl. No.: 689,805

[22] PCT Filed: Nov. 20, 1989

[86] PCT No.: PCT/GB89/01381

§ 371 Date: Jul. 11, 1991

§ 102(e) Date: Jul. 11, 1991

[87] PCT Pub. No.: WO90/05615

PCT Pub. Date: May 31, 1990

[30] Foreign Application Priority Data

Nov. 23, 1988 [GB] United Kingdom ............... 8827341

[51] Int. Cl.⁵ .......................... B26D 1/18; B27B 5/02
[52] U.S. Cl. ...................................... 83/364; 83/365; 83/368; 83/452; 83/477.001; 83/488; 83/676; 83/943; 144/3 R; 144/357; 144/367; 29/426.004
[58] Field of Search ............... 83/364, 365, 368, 452, 83/477.1, 488, 666, 676, 776, 781, 850, 872, 873, 943, 751, 435.2; 29/239, 426.4, 426.5; 144/3 R, 357, 367

[56] References Cited

U.S. PATENT DOCUMENTS

| | | | |
|---|---|---|---|
| 2,705,979 | 4/1955 | Starr | 83/477.1 |
| 2,735,459 | 7/1956 | Stauder | 83/850 |
| 3,229,732 | 1/1966 | Mayo | 83/435.2 X |
| 4,196,648 | 4/1980 | Jones et al. | 83/365 |
| 4,241,495 | 12/1980 | Wakeem | 83/943 X |
| 4,306,478 | 12/1981 | Stolzer | 83/488 X |
| 4,320,570 | 3/1982 | Williams | 29/239 X |
| 4,346,506 | 8/1982 | Martindale | 29/239 |
| 4,464,960 | 8/1984 | Roepers et al. | 83/488 X |
| 4,757,599 | 7/1988 | Bane | 83/401 X |
| 4,920,495 | 4/1990 | Pilkington | 83/862 X |

Primary Examiner—Frank T. Yost
Assistant Examiner—Raymond D. Woods
Attorney, Agent, or Firm—Spensley Horn Jubas & Lubitz

[57] ABSTRACT

A pallet-cutting machine for selectively removing individual components of a load-bearing pallet. The machine includes: a support unit defining a support plane to support the pallet during a cutting operation thereon, holding members operable to hold the pallet against movement relative to the support unit during a cutting operation on the pallet, at least one guideway having a guide axis extending parallel to the support plane, at least one rotary cutter mounted for movement along the guide axis of the guideway, the cutter having a cutting edge extending parallel to the guide axis whereby the cutting edge is movable parallel to deck components of the pallet when the pallet is held on the support unit to cut through at least one of the components of the pallet, a drive mechanism for imparting rotary motion to the cutter, and an adjusting system for imparting relative movement between the cutter and the pallet when held on the support unit in directions parallel and perpendicular to the support plane, whereby the cutter is selectively adjustable relative to the pallet in directions parallel and perpendicular to the plane of the pallet for cutting the pallet in a preselected region where a selected deck component is fastened to a selected interconnecting component in order to separate the selected deck component from the selected interconnecting component.

20 Claims, 5 Drawing Sheets

PALLET CUTTING MACHINE

This invention is concerned with a pallet cutting machine for use in removing pieces from a load-bearing pallet so that such pieces can be replaced in repairing a pallet.

A typical load-bearing pallet comprises a load-supporting deck made of planks arranged parallel to one another and joined by cross planks, blocks secured to the underside of the load-supporting deck and allowing access beneath the deck for the forks of fork-lift trucks, and a lower ground-engaging deck comprising planks secured to the blocks. Such a pallet gives four-way access for a fork- lift truck and may comprise nine blocks and seventeen planks nailed together. It is found that such a pallet is frequently damaged in use by the breakage or splitting of one or more of the planks and blocks. When such damage is only to one or to a small number of the planks or blocks, it is common practice to repair the pallet by removing the damaged piece or pieces and replacing them. At present, this is normally carried out using hand tools by levering the joints of the damaged piece apart and cutting the nails involved with a hacksaw. This essentially manual operation is physically demanding, time consuming and may result in further damage to the pallet.

It is an object of the present invention to provide a machine for use in removing pieces of load-bearing pallets by which the pieces can be removed by cutting operations.

The invention provides a machine for use in removing pieces from a load-bearing pallet, the machine comprising support means arranged to support a pallet during a cutting operation thereon, holding means operable to hold a pallet against movement relative to the support means during a cutting operation on the pallet, a guideway extending parallel to the support means, drive means for a cutter mounted on the guideway for movement along the guideway, the drive means being arranged to support and drive a cutter having a cutting edge extending parallel to the support means and drivable to cut through wood and/or nails of the pallet during movement of the drive means, and adjusting means operable to adjust the spacing from the support means at which the drive means supports the cutter.

In a machine according to the last preceding paragraph, the cutter can be set level with a joint between a sound piece of the pallet and a damaged piece thereof and the drive means can be moved along the guideway to cut through the joint. Alternatively, the cut can be performed within the damaged piece but adjacent said joint so that a thin piece of the damaged piece remains attached to the sound piece, the thin piece being readily removable. In either case, the damaged part can be removed by cutting operations without substantial risk of damage to other parts of the pallet. Although the machine is described in relation to a four-way entry pallet, it can readily be adapted to the two-way pallets favored in some countries.

Conveniently, the support means may comprise a horizontally-extending table across which the pallet may be slid into position beneath the guideway which extends horizontally above the table and the cutting edge also extends horizontally.

The holding means may comprise a plurality of holding members arranged to engage planks of a deck of the pallet and clamp the pallet either against opposed holding members or a fixed stop. The holding members may be movable between an operative position thereof in which they project through openings in a support surface of said support means to engage the pallet and an out-of-the-way position in which the holding members are located beneath said support surface. In this way, the holding members do not impede the movement of the pallet into position beneath the guideway.

The adjusting means may comprise jack means, for example screw jacks, supporting opposite ends of said guideway and operable together to adjust said opposite ends. Alternatively, the drive means may be mounted on a carriage which is movable along said guideway and the adjusting means may comprise jack means operable to adjust the cutter relative to said carriage. The machine may comprise motor means operable to operate said jack means. Control means may be associated with said motor means and be operable to cause the motor means to operate said jack means to bring the cutter to a selected one of a plurality of predetermined positions. For example, these predetermined positions may represent the heights of joints between planks and blocks, or planks and other planks above a horizontal table. The machine may also comprise sensing means operable to sense the height of the top of the pallet to enable said plurality of predetermined positions to be determined. Alternatively, the machine may comprise joint detecting means operable to detect a joint to be cut and control means associated with said motor means and operable to cause the motor means to operate said jack means to bring the cutter to the position of the joint. The joint detecting means may comprise a radiation sensitive device, for example a CCD camera.

The machine may also comprise moving means operable to move said drive means along said guideway. Said moving means may comprise, for example, a hydraulic ram. Said moving means may be operable to move said drive means to one of a plurality of predetermined starting positions and then to move the cutting means through a stroke associated with said starting position. Each starting position would be associated with a cut necessary for the removal of a particular piece from a pallet and the stroke associated therewith represents the length of the cut necessary.

Conveniently, the cutting means has supports for two or more alternative cutters which can be selected in accordance with the type of cut required. For example, if it is desired to cut through the wood rather than the joint one cutter can be used whereas if it is desired to cut through the joint the other cutter can be used. The cutters may also have different diameters and be selected on the basis of the depth of cut required.

Conveniently, the guideway may comprise two parallel rods along which the drive means can slide.

The guideway of the machine may be mounted on a further guideway which extends at right angles to the first-mentioned guideway. This allows the drive means to be moved in a plane and allows a selection between cutting in two mutually-perpendicular directions. Moving means may be operable to move said guideway along said further guideway. The machine may comprise further drive means mounted on said guideway or on other similar guideways mounted on said further guideway. This allows simultaneous cutting of several joints using separate drive means.

The machine preferably comprises a cutter in the form of a metal disc, having a cutting edge around its periphery, the upper and lower surfaces of the disc being inclined to one another to create a wedge-shape. The wedge-shape enables the cutter to wedge a joint apart while the cutting edge cuts through the nails. The cutting edge need not be sharp as the edge running on the nail causes friction cutting. The disc may be bevelled on both sides of the cutting edge. The disc may rotate during cutting at between 50 and 300 revolutions per minute.

There now follows a detailed description, to be read with reference to the accompanying drawings, of two machines for use in removing parts of pallets which are illustrative of the invention. It is to be understood that the illustrative machines have been selected for description by way of example and not of limitation of the invention.

Figure 1:
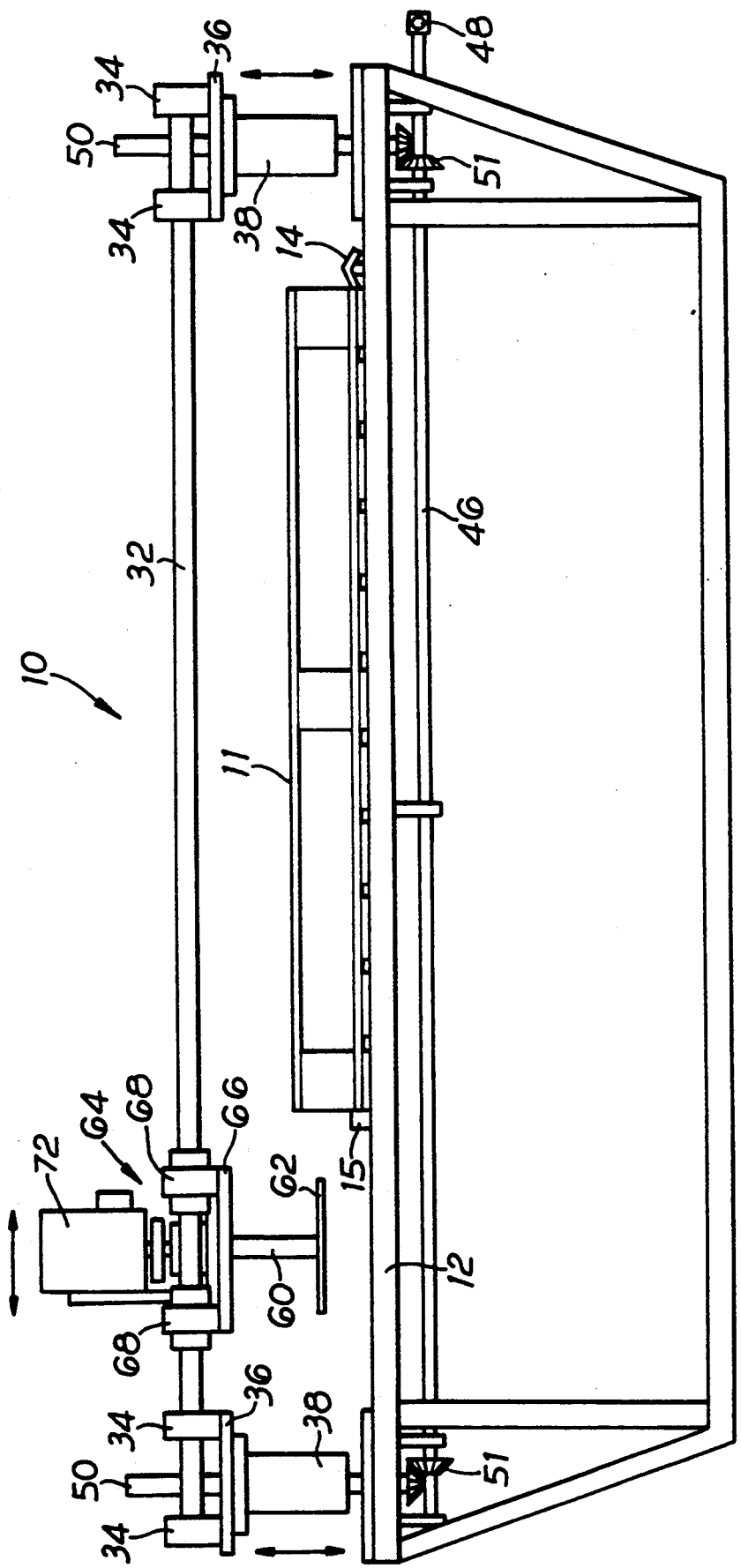
FIG. 1 is a side elevational view of the first illustrative machine.

The first illustrative machine 10 is for use in removing pieces from a load-bearing pallet 11 and comprises support means in the form of a horizontally-extending table 12 arranged to support the pallet 11 during a cutting operation thereon. The table 12 is arranged to support the pallet 11 with either its load-supporting deck or its ground-engaging deck in contact with the table 12.

The machine 10 also comprises holding means operable to hold the pallet 11 on the table 12 against movement relative to the table 12 during a cutting operation on the pallet. The holding means comprises a plurality of holding members 14 which are arranged to engage end portions of the planks of a deck of the pallet on the table 12. Each holding member 14 has an operative position (shown in FIGS. 1 and 2) in which they project through openings 16 in a support surface of the table 12 to engage the pallet and an out-of-the-way position (not shown) in which the holding members 14 are located beneath said support surface. The holding members 14 are mounted on a common shaft 18 which extends horizontally beneath the table 12 and is mounted to turn about its longitudinal axis. Two arms 20 project radially from the shaft 18 and are fixed thereto. The arms 20 are each pivotally connected to a toggle bar 22 which is slidable horizontally beneath the table. The toggle bar 22 can be moved horizontally by means of a lever 24 which is mounted for pivoting movement on a block 26 which depends from the table 12. Operation of the lever 24 causes the shaft 18 to turn about its longitudinal axis moving the holding members 14 between their operative and out-of-the-way positions. The holding members 14 are arranged to clamp the pallet 11 against a stop 15 projecting upwardly from the table 12. Alternatively, opposed holding members may replace the stop 15.

Figure 2:
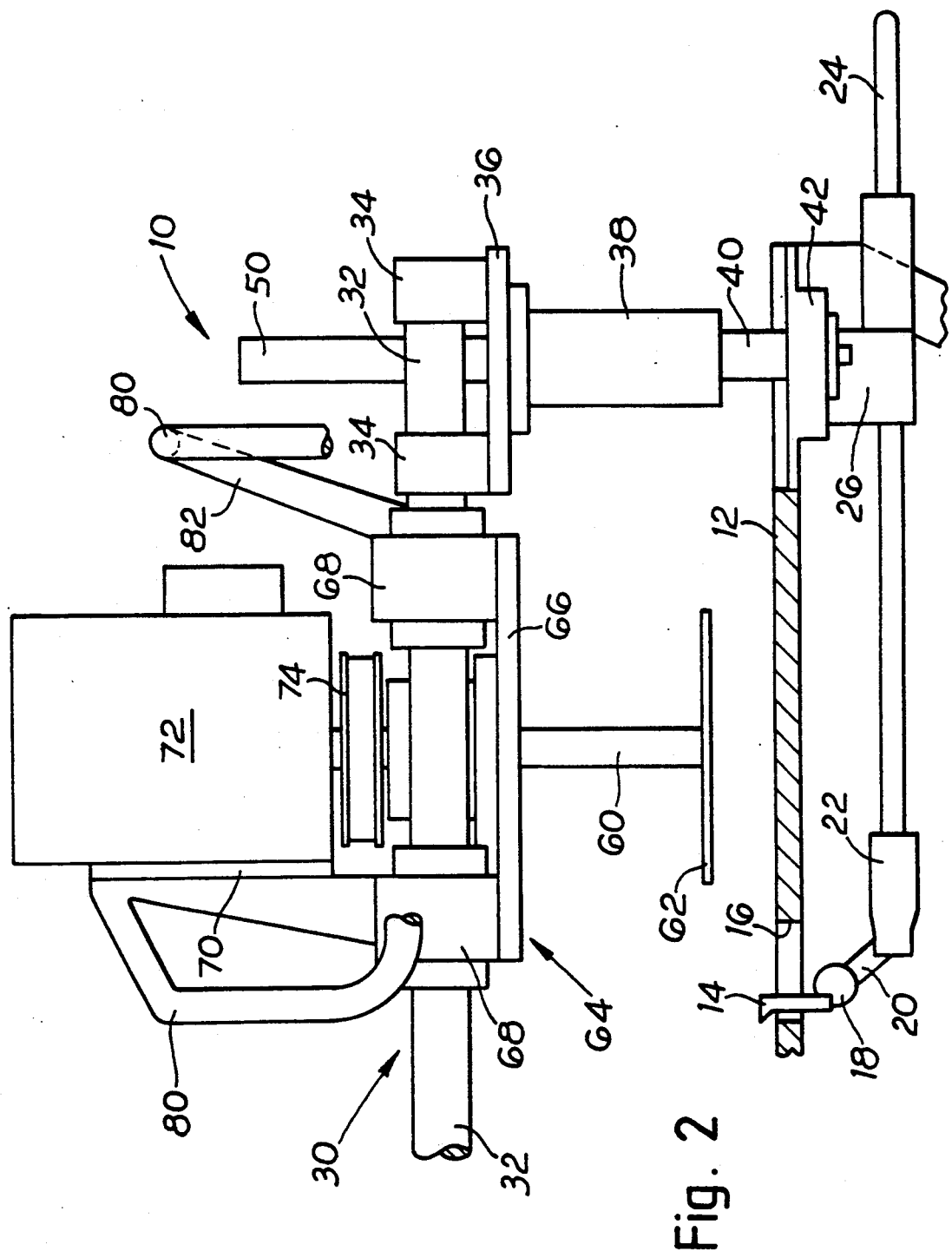
FIG. 2 is a front elevational view of the first machine, on a larger scale than FIG. 1, of a portion of the illustrative machine.

The machine 10 also comprises a horizontally-extending guideway 30 extending parallel to said table 12. The guideway 30 comprises two parallel rods 32 at equal heights above the table 12 (only the front one of the rods 32 is visible in FIG. 1). Each rod 32 is supported by four clamp blocks 34. Two of the clamp blocks 34 support one end of the rod 32 and are mounted on a plate 36 while the remaining two clamp blocks 34 support the opposite end of the rod 32 and are mounted on a further plate 36 (FIG. 1). Each plate 36 extends horizontally and supports two clamp blocks 34 at the end of each of the rods 32.

Each plate 36 is mounted on two sliders 38 (only the front one of which is visible in the drawings). Each slider 38 depends from the plate 36 and can slide on a vertical rod 40 which projects upwardly from the table 12 being mounted thereon on a retaining collar 42. Each rod 40 extends through one of the sliders 38 and can pass through an opening (not shown) in the plate 36. A bracing member 44 interconnects the tops of each pair of vertical rods 40 to brace them against movement relative to one another. Thus, the plates 36 and the guideway 30 are mounted on four vertical rods 40 and can slide upwardly or downwardly relative to said rods 40.

The machine 10 also comprises height adjusting means operable to adjust the spacing of the guideway 30 from the table 12 and hence to adjust, as will appear below, the spacing at which drive means 72 supports a cutter 62 relative to the table. The height adjusting means comprises jack means supporting opposite ends of said guideway and operable together to adjust the height of said opposite ends. The jack means comprises a shaft 46 which extends beneath the table 12 parallel to the rods 32. At one end thereof, the shaft 46 carries a handle 48 by which the shaft 46 can be turned about its longitudinal axis. Turning the shaft 46 causes rotation of two threaded rods 50 which project upwardly from the table 12. The rods 50 are rotatably connected to the shaft 46 by means of bevel gears 51. Each of the threaded rods 50 is mounted on a bearing (not shown) supported beneath the table 12 to rotate about its longitudinal axis and extends upwardly to mesh with a threaded passage through the support plate 36. Each threaded rod 50 then passes through a hole 52 in the bracing member 44. Operation of the handle 48 to turn the shaft 46 causes both the threaded rods 50 to rotate about their longitudinal axes so that both the support plates 36 are moved upwardly or downwardly by the same amount. Thus the guideway 30 is maintained parallel to the table 12 and can be adjusted heightwise relative thereto. In a modification of the illustrative machine 10, the shaft 46 can be driven by a motor which provides motor means of the height adjusting means operable to operate said jack means. Such a motor may be an electric motor associated with a brake arranged to come on automatically when the power supply to the motor is cut off. The height adjusting means may also comprise control means associated with the motor means and operable to cause the motor to operate to bring the guideway 30 to a selected one of a plurality of predetermined heights above the table 12. A sensor may provide sensing means of the machine operable to sense the height of the top of a pallet on the table 12 to enable said plurality of predetermined heights to be determined. Such a sensor may operate optically, mechanically or ultrasonically.

The machine 10 also comprises drive means arranged to support and drive a cutter 62 having a horizontally-extending cutting edge. The cutter is drivable to cut through wood and/or nails of the pallet 11 during horizontal movement of the drive means along the guideway 30. The drive means comprises a support for the cutter 62 in the form of a vertical shaft 60 on which a cutter 62 is mounted. The cutter 62 may be in the form of a disc having teeth around the periphery thereof or having cutting blades mounted thereon or may have cutting blades mounted in orifices in the disc and teeth around the periphery. Another alternative is for the cutter 62 to be wedge-shaped so that it tends to separate joints of a pallet by a wedging action, for example the cutter shown in FIG. 5.

The support shaft 60 is mounted for rotation about a longitudinal axis thereof on a carriage 64 of the drive means which is movable along the guideway 30.

The carriage 64 comprises a horizontal plate 66 on which are mounted four slide blocks 68. Two of the slide blocks 68 are slidable on each of the rods 32 of the guideway 30.

Figure 3:
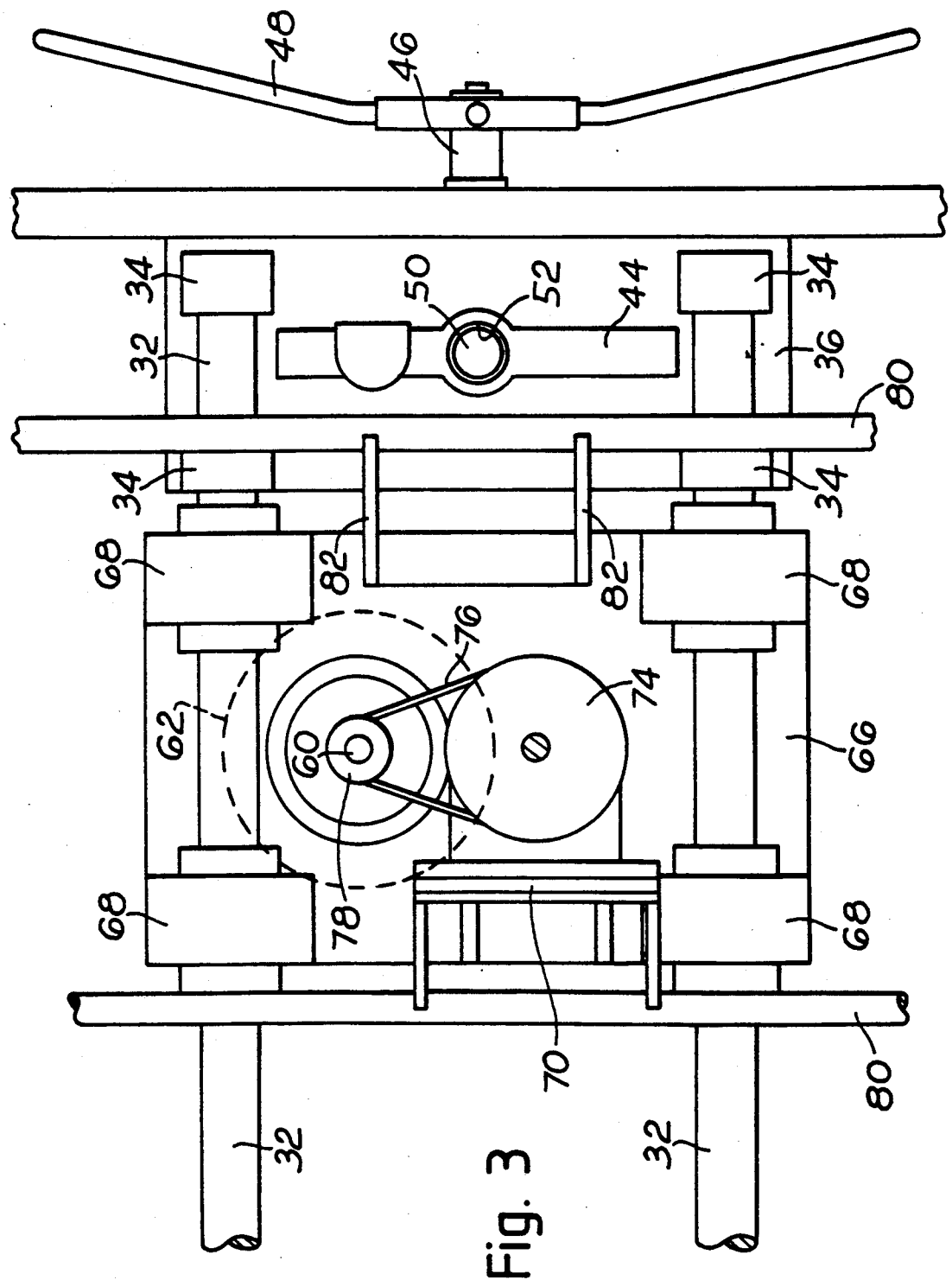
FIG. 3 is a plan view of the portion of the first machine shown in FIG. 2.

A bracket 70 projects upwardly from the plate 66 of the carriage 64 between the rods 32 of the guideway 30. This bracket 70 supports a vertically disposed electric motor 72 of the drive means which has its output shaft extending downwardly. The motor 72 has been omitted from FIG. 3. A pulley 74 is mounted on the drive shaft of the motor 72 and is connected by a drive belt 76 to a pulley 78 mounted on the support shaft 60. Thus, when the motor 72 is operated, the shaft 60 and therefore the cutter 62 are rotated. The motor 72 receives its power supply from a flexible cable (not shown) which accommodates the motion of the drive means along the guideway 30. A handle 80 extends around the carriage 64 and is connected to the bracket 70 and, by means of upwardly projecting brackets 82, to the plate 66. The handle 80 and the brackets 82 have been omitted from FIG. 1. The handle 80 provides means for moving the cutting means along the guideway so that the cutter 62 cuts through the piece of the pallet which it is desired to remove or the joint between that piece and adjoining pieces. However, in a modification of the machine 10, the machine comprises moving means operable to move said cutting means along said guideway, for example, in the form of a hydraulic ram. Said moving means may be operable to move the drive means to one of a plurality of predetermined starting positions and then to move the cutting means through a stroke associated with said starting position.

In another modification of the machine 10, the cutting means may have supports for two or more alternative cutters each with their own associated motors and the cutters can be selected in accordance with the type of cut required.

In the operation of the machine 10, the height adjusting means is used to raise the guideway 30 and hence the cutting means to a height such that the cutter 62 is above the level of a pallet on the table 12, a pallet is then introduced on to the table 12 and the holding means is used to hold the pallet against movement. It should be noted that the pallet is normally positioned in inverted position so that access to the interior thereof may be obtained through the gaps in the bottom or ground-engaging deck thereof. The cutting means is then moved along the guideway 30 to the starting position for the desired cut and the height adjusting means is used to lower the cutter to the correct height to make the cut. The motor 72 is then operated to cause the cutter 62 to rotate and then the cutting means is moved along the guideway 30 through a stroke sufficient to make the cut required.

Figure 4:
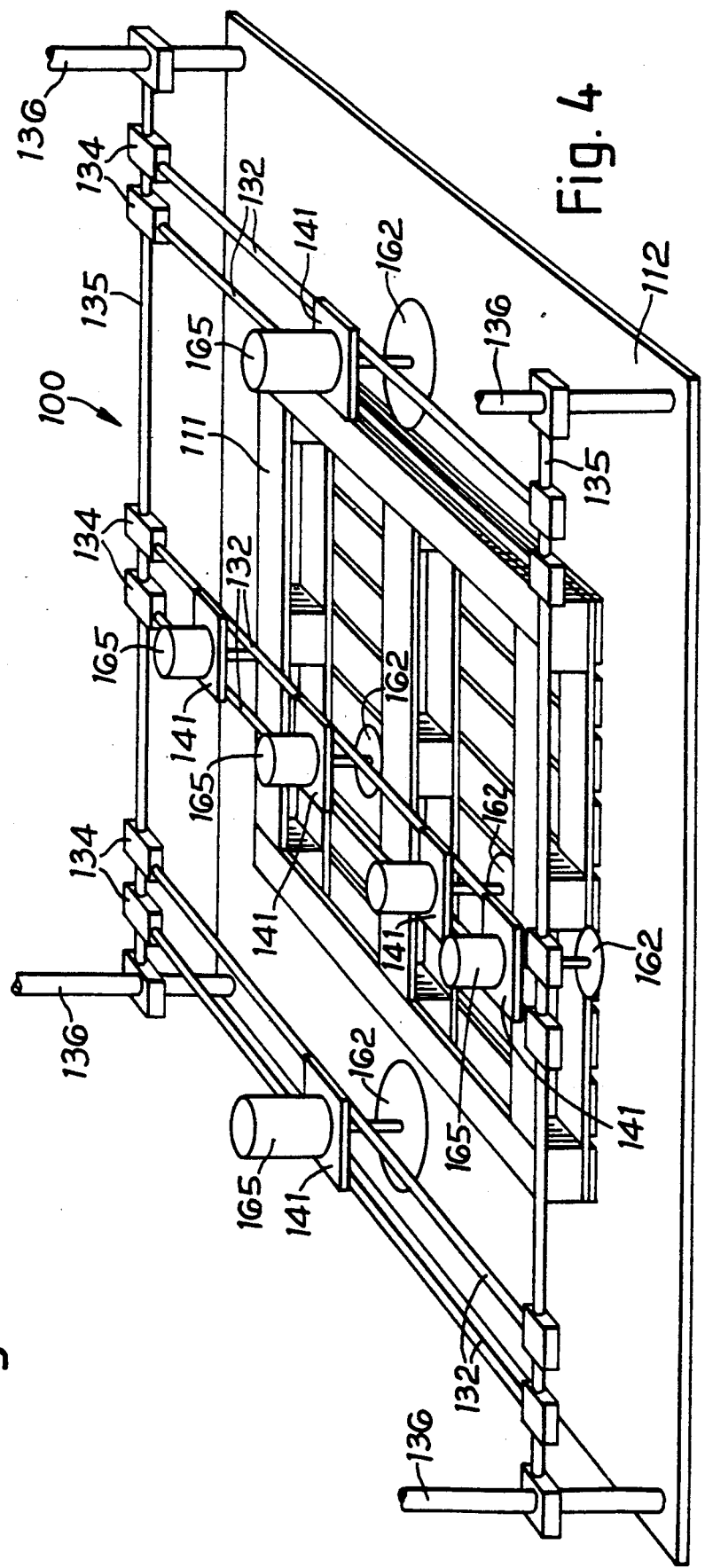
FIG. 4 is a diagrammatic perspective view of the second illustrative machine.
Figure 6:
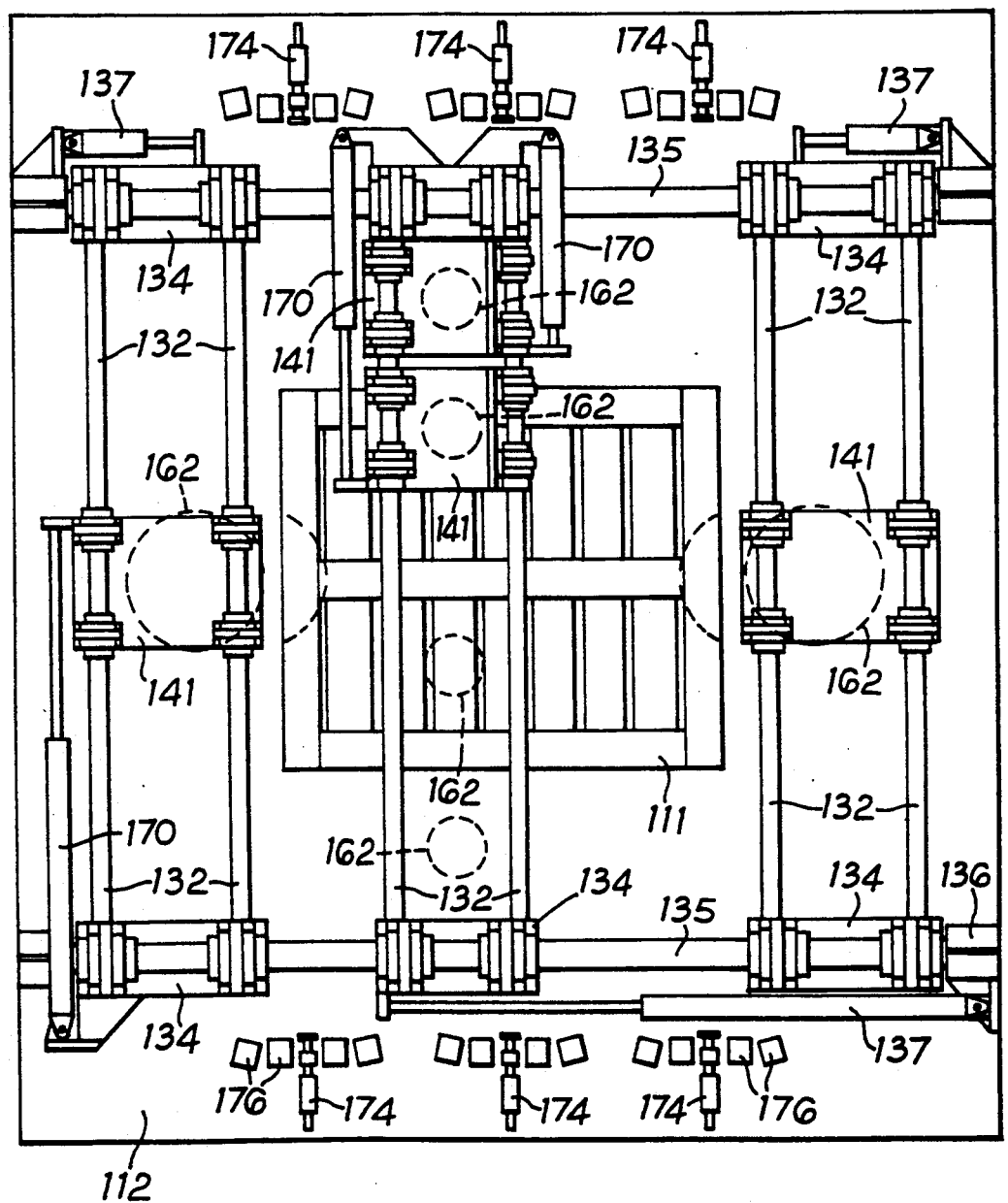
FIG. 6 is a plan view of the second machine.

The second illustrative machine 100 is shown in FIGS. 4 and 6 and unlike the machine 10 is fully automatic and can make several cuts on a pallet 111 simultaneously. The machine 100 comprises support means in the form of a table 112 arranged to support the pallet 111 during a cutting operation thereon. Holding means (not shown) similar to the holding members 14 is operable to hold the pallet 111 against movement relative to the table 112 during a cutting operation.

The machine 100 comprises three guideways each extending horizontally above the table 112. The three guideways extend parallel to one another at a level above the top of the pallet 111 on the table 112. Each guideway comprises two parallel rods 132. The opposite ends of each rod 132 are supported by sliders 134 which are mounted for sliding movement on a further guideway which extends horizontally at right angles to the three first-mentioned guideways. This further guideway comprises two parallel rods 135 which are supported by four vertical columns 136 which extend upwardly from the corners of the table 112.

The sliders 134 are moved along the rods 135 by hydraulic rams 137 acting between the columns 136 and the sliders 134. These rams 137 are in pairs acting on opposite ends of the guideways formed by the rods 132. Each of the end guideways, thus, has two short rams 137 acting thereon while the center guideway has two longer rams 137 acting thereon. There are thus a total of six rams 137 but in the interests of clarity these have been omitted from FIG. 4 and only three are shown in FIG. 6.

Four carriages 141 are mounted on the central guideway formed by the rods 132 for sliding movement. Each carriage 141 carries drive means 165 arranged to support and drive a cutter 162 having a horizontally-extending cutting edge 163 drivable to cut through wood and/or nails of the pallet 111 during horizontal movement of the drive means. The drive means 165 comprises an electric motor arranged to rotate the cutter 162 at a speed of between 50 and 300 revolutions per minute about a vertical axis. The electric motor of the drive means 165 is combined in a unit with a hydraulic jack means which provides height adjusting means operable to adjust the height at which the drive means 165 supports the cutter 162 relative to the carriage 141 and hence relative to the table 112. The jack means may comprise an hydraulic or pneumatic ram combined with a linear encoder and operates to move the cutter 162 and its drive motor on a vertical slideway.

The carriages 141 are moved along the rods 132 by hydraulic rams 170 (not shown in FIG. 4 and only three shown in FIG. 6). There is one ram 170 per carriage 141 acting between the carriage 141 and the sliders 134 at one end of the guideway. In the case of the end guideways, the rams 170 are long and extend from one end of the guideway to the carriage 141. In the case of the four carriages 141 on the central guideway, two rams 170 extend from each end of the guideway to the two nearest carriages 141. The cutters 162 on the carriages 141 of the central guideway are of smaller diameter than those on the carriages 141 of the outer guideways. FIG. 6 omits the drive means 165, shows only two of the carriages 141 on the central guideway, but indicates the position of the four cutters 162 in broken line. The second cutter 162 from the top of FIG. 6 is in use for cutting through a joint.

The outer two guideways formed by the rods 132 each have one carriage 141 with a drive means 165 mounted thereon for sliding movement. However, these carriages and drive means are bigger than those of the central guideway as they carry cutters 162 having a bigger diameter. These carriages 141 also have a longer stroke as they can traverse the entire width of the pallet 111.

The two large cutters 162 are for cutting into opposite edges of the pallet 111 and each can cut through a joint on its own. The two central ones of the four small cutters 162 are arranged to enter the pallet 111 through the gaps in its ground-engaging deck (which is uppermost on the table 112). To cut a joint in the centre of the pallet, one of these two central small cutters 162 is moved through just over half of the joint and then the other moves through just over half the joint to complete the cut from the opposite direction. Each central small cutter 162 co-operates in a similar way with one of the outer small cutters to cut joints at the edge of the pallet 111.

The machine 100 also comprises joint detecting means operable to detect a joint to be cut. The joint detecting means comprises radiation sensitive devices in the form of CCD cameras 174. There are six cameras 174 ranged three on each side of the pallet 111 opposite blocks of the pallet. Each camera 174 has four lamps 176 associated therewith arranged to direct radiation on to the pallet 111. The cameras 174 and lamps 176 have been omitted from FIG. 4. The cameras 174 supply their output to control means in the form of a microprocessor (not shown) which causes the jack means of the drive means 165 to bring the cutter to the height of the joint detected. When all three cameras 174 on one side of the pallet are detecting the same joint, i.e. that of a plank, the results from all three can be used. When the joint to be cut cannot be presented to the cameras 174, i.e. a central joint, the height of a joint which can be presented and which should be at the same height is detected instead and an interpolation is used. This allows the machine to take account of variations in the height of planks and blocks in a pallet.

Figure 5:
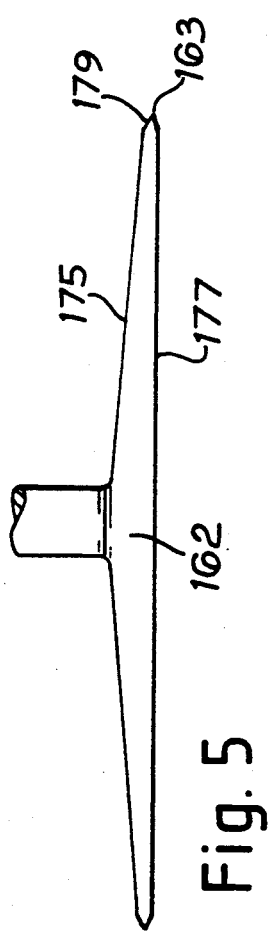
FIG. 5 is an elevational view of a cutter of the second machine.

One of the cutters 162 is shown in FIG. 5. It is a steel disc having its cutting edge 163 around its periphery. The disc forms a wedge-shape by having its upper surface 175 inclined to its lower surface 177. The lower surface 177 is flat while the upper surface is conical. The wedge-shape enables the cutter to wedge the wood at a joint apart while the cutting edge 163 severs the nails. The cutter 162 is bevelled at 179 on both sides of its cutting edge 163 so that the cutting edge is not coplanar with the bottom surface 177. The cutting edge 163 cuts through the nails by friction cutting and hence need not be sharp and hence provides little hazard to an operator. A maximum thickness of 6 millimeters for the disc has been found to be acceptable. A wedge angle of less than 5 degrees has also been found to give good results.

In the operation of the machine 100, the pallet 111 is fed into position on the table 112 and clamped in position. The operator then programmes the control means with which a piece or pieces are to be removed. The control means first determines whether removal of the piece or pieces proposed will weaken the pallet beyond an acceptable level and, if so, warns the operator. If the strength will not be unacceptably weakened, the control means operates the appropriate cameras 174 to detect the heights of the joints to be cut and then deploys the appropriate cutter or cutters 162 to cut them.

What is claimed is:

1. A pallet-cutting machine for selectively removing individual components of a load-bearing pallet, the pallet being composed of load-supporting deck components forming a load-supporting deck, ground-engaging deck components forming a ground-engaging deck, interconnecting components interposed between the decks and fastening means fastening the decks to the interconnecting components, the machine comprising:

support means defining a support plane to support the pallet during a cutting operation thereon, holding means operable to hold the pallet against movement relative to said support means during a cutting operation on the pallet, at least one guideway having a guide axis extending parallel to said support plane, at least one rotary cutter mounted for movement along said guide axis of said at least one guideway, said cutter having a cutting edge extending parallel to said guide axis whereby said cutting edge is movable parallel to one of said deck components of the pallet when the pallet is held on said support means to cut through at least one of the components and fastening means of the pallet, drive means for imparting rotary motion to said rotary cutter;

adjusting means for imparting relative movement between said cutter and the pallet when held on said support means in directions parallel and perpendicular to said support plane whereby said cutter is selectively adjustable relative to the pallet in directions parallel and perpendicular to the support plane for cutting the pallet in a preselected region where a selected deck component is fastened to a selected interconnecting component in order to separate the selected deck component from the selected interconnecting component, said adjusting means comprising control means operable to bring said cutter to a selected one of a plurality of predetermined positions, and sensing means operable to sense a part of the pallet to enable said plurality of predetermined positions to be determined.

2. A machine according to claim 1, characterized in that the support means comprises a horizontally-extending table.

3. A machine according to claim 1, characterized in that the holding means comprises a plurality of holding members arranged to engage planks of one deck of the pallet and clamp the one deck against opposed holding members.

4. A machine according to claim 3, characterized in that the holding members are movable between an operative position thereof in which they project through openings in a support surface of said support means to engage the pallet and an out-of-the-way position in which the holding members do not project through said openings 5. A machine according to claim 1, characterized in that the adjusting means comprises jack means supporting opposite ends of said guideway and operable together to adjust said opposite ends.

6. A machine according to claim 1, characterized in that the drive means is mounted on a carriage which is movable along said guideway and the adjusting means comprises jack means operable to adjust the cutter relative to said support means.

7. A machine according to claim 6, characterized in that the machine comprises motor means operable to operate said jack means.

8. A machine according to claim 7, characterized in that said control means is associated with said motor means and is operable to cause the motor means to operate said jack means to bring the cutter to said selected one of a plurality of predetermined positions.

9. A machine according to claim 1, characterized in that the machine also comprises moving means operable to move said drive means along said guideway.

10. A machine according to claim 1, characterized in that the cutter is in the form of a metal disc, having a cutting edge around its periphery, and having opposed surfaces which are inclined to one another to create a wedge-shape.

11. A machine according to claim 1, characterized in that the cutter is bevelled on both sides of the cutting edge.

12. A machine as claimed in claim 1 wherein said adjusting means comprise means for imparting relative movement between said cutter and the pallet when held on said support means in a direction perpendicular to said support plane between a first position in which said cutter is disposed for cutting a first preselected region where a selected load-supporting deck component is fastened to a selected interconnecting component, and a second position in which said cutter is disposed for cutting a second preselected region where a selected ground-engaging deck component is fastened to a selected interconnecting component.

13. A pallet-cutting machine for selectively removing individual components of a load-bearing pallet, the pallet being composed of load-supporting deck components forming a load-supporting deck, ground-engaging deck components forming a ground-engaging deck, interconnecting components interposed between the decks and fastening means fastening the decks to the interconnecting components, the machine comprising:
  support means defining a support plane to support the pallet during a cutting operation thereon,
  holding means operable to hold the pallet against movement relative to said support means during a cutting operation on the pallet,
  at least one guideway having a guide axis extending parallel to said support plane,
  at least one rotary cutter mounted for movement along said guide axis of said at least one guideway, said cutter having a cutting edge extending parallel to said guide axis whereby said cutting edge is movable parallel to one of said deck components of the pallet when the pallet is held on said support means to cut through at least one of the components and fastening means of the pallet,
  drive means for imparting rotary motion to said rotary cutter;
  adjusting means for imparting relative movement between said cutter and the pallet when held on said support means in directions parallel and perpendicular to said support plane whereby said cutter is selectively adjustable relative to the pallet in directions parallel and perpendicular to the support plane for cutting the pallet in a preselected region where a selected deck component is fastened to a selected interconnecting component in order to separate the selected deck component from the selected interconnecting component,
  joint detecting means operable to detect a joint to be cut, and
  control means operable to bring said cutter to the position of the joint.

14. A machine according to claim 13, characterized in that the joint detecting means comprises a radiation sensitive device.

15. A machine according to claim 14, characterized in that the joint detecting means comprises a camera.

16. A machine according to claim 13, wherein said adjusting means comprise jack means operable to adjust said cutter relative to said support means, and said control means are operable to cause said jack means to bring the cutter to the position of the joint.

17. A pallet-cutting machine for selectively removing individual components of a load-bearing pallet, the pallet being composed of load-supporting deck components forming a load-supporting deck, ground-engaging deck components forming a ground-engaging deck, interconnecting components interposed between the decks and fastening means fastening the decks to the interconnecting components, the machine comprising:
  support means defining a support plane to support the pallet during a cutting operation thereon,
  holding means operable to hold the pallet against movement relative to said support means during a cutting operation on the pallet,
  a plurality of guideways each having a guide axis extending parallel to said support plane,
  a plurality of cutters each of which is mounted for movement along the guide axis of a respective guideway, each said cutter having a cutting edge extending parallel to said guide axis of said respective guideway whereby said cutting edge is movable parallel to one of said deck components of the pallet when the pallet is held on said support means to cut through at least one of the components and fastening means of the pallet,
  drive means for imparting rotary motion to each said rotary cutter, and
  adjusting means for imparting relative movement between each said cutter and the pallet when held on said support means in directions parallel and perpendicular to said support plane whereby each said cutter is selectively adjustable relative to the pallet in directions parallel and perpendicular to the support plane for cutting the pallet in a preselected region where a selected deck component is fastened to a selected interconnecting component in order to separate the selected deck component from the selected interconnecting component, at least one of said cutters being adjustable independently of the other cutters relative to the pallet held on said support means in directions parallel and perpendicular to said support plane.

18. A machine as claimed in claim 17 wherein each of said cutters is adjustable independently of the other cutters relative to the pallet held on said support means in directions parallel and perpendicular to said support plane.

19. A machine according to claim 18, characterized in that one of said plurality of guideways is mounted on a further guideway which extends at right angles to said one of said plurality of guideways.

20. A machine according to claim 19, characterized in that the machine comprises moving means operable to move said one of said plurality of guideways along said further guideway.

* * * * *